(12) United States Patent
Neimark

(10) Patent No.: US 7,118,714 B2
(45) Date of Patent: Oct. 10, 2006

(54) MODULE AND APPARATUS FOR SYNTHESIS OF ORGANIC MOLECULES OR THE LIKE

(75) Inventor: Jean Neimark, Strasbourg (FR)

(73) Assignee: Centre National de la Recherche Scientifique (Etablissment Public a Caractere Scientifque et Technologique), Paris (FR)

( * ) Notice: Subject to any disclaimer, the term of this patent is extended or adjusted under 35 U.S.C. 154(b) by 480 days.

(21) Appl. No.: 10/221,783

(22) PCT Filed: Mar. 16, 2001

(86) PCT No.: PCT/FR01/00802

§ 371 (c)(1),
(2), (4) Date: Sep. 17, 2002

(87) PCT Pub. No.: WO01/68237

PCT Pub. Date: Sep. 20, 2001

(65) Prior Publication Data

US 2003/0157001 A1    Aug. 21, 2003

(30) Foreign Application Priority Data

Mar. 17, 2000  (FR) .................................. 00 03478

(51) Int. Cl.
*B01J 19/00* (2006.01)
(52) U.S. Cl. ...................................... 422/130; 422/102
(58) Field of Classification Search ................ 422/130, 422/102
See application file for complete search history.

(56) References Cited

U.S. PATENT DOCUMENTS

| 3,567,396 A | * | 3/1971 | Setzler ........................ 422/193 |
| 4,183,897 A | * | 1/1980 | Lanteri ........................ 422/197 |
| 5,866,342 A | | 2/1999 | Kulikov et al. |
| 6,566,461 B1 | * | 5/2003 | Freitag et al. ................ 526/65 |
| 6,767,514 B1 | * | 7/2004 | Cunliffe ...................... 422/130 |

FOREIGN PATENT DOCUMENTS

| EP | 0 963 791 | | 12/1999 |
| FR | 2664602 | | 1/1992 |
| WO | 98/57181 | | 12/1998 |
| WO | 99/13988 | | 3/1999 |
| WO | WO 99/13988 | * | 3/1999 |

* cited by examiner

*Primary Examiner*—Jill Warden
*Assistant Examiner*—Natalia Levkovich
(74) *Attorney, Agent, or Firm*—Young & Thompson

(57) ABSTRACT

A module for the synthesis of organic molecules on or in solid phase and an apparatus comprising at least such a module. The module consists of several synthesis reactors formed, each, by a tubular body forming a reaction chamber delimited in its lower part by a removable porous wall, designed to retain the synthesis support material, an injection and expanding head forming an upper closure plug for the tubular body, a closure and emptying base mounted removable in a lower extension of the tubular body. Each reactor is provided with a heat exchanger in close peripheral contact with the tubular body at least at the part of the chamber designed to contain the medium and the reaction compounds and a condenser in close peripheral contact with the body at the part of the chamber extending above that containing the medium and the reaction compounds and beneath the injection head.

16 Claims, 13 Drawing Sheets

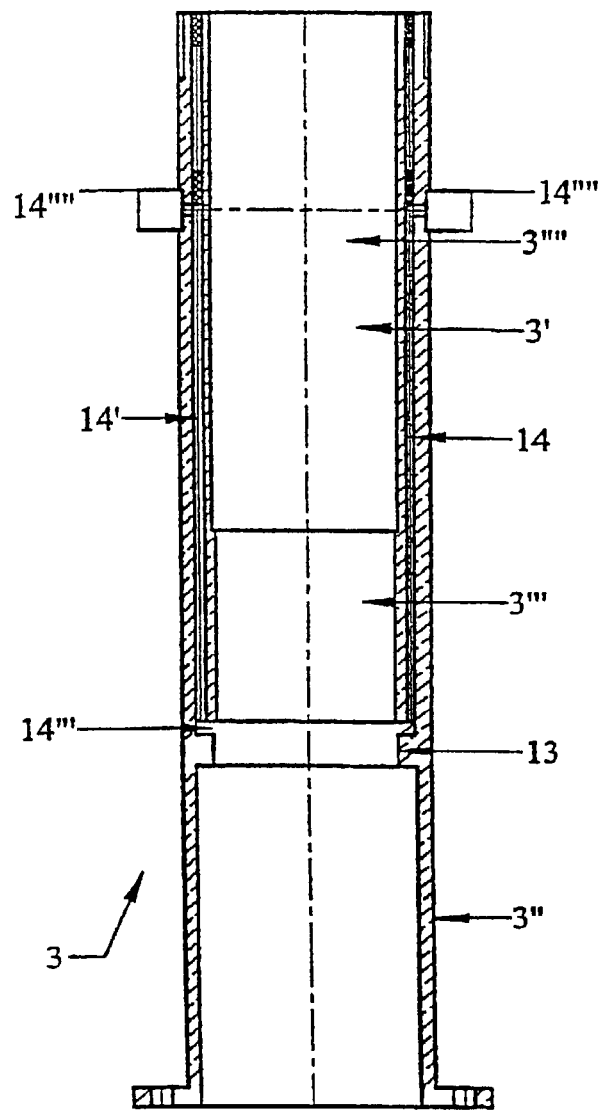
Fig.6
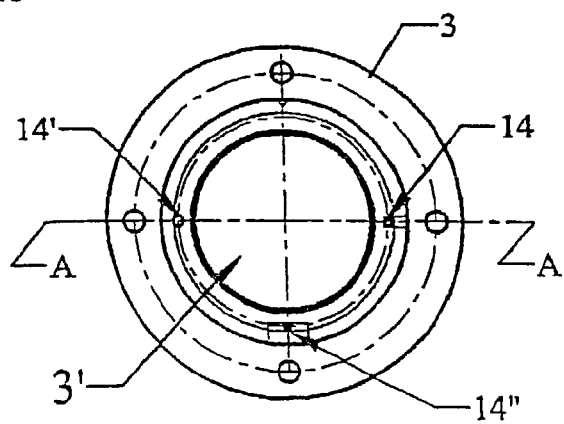

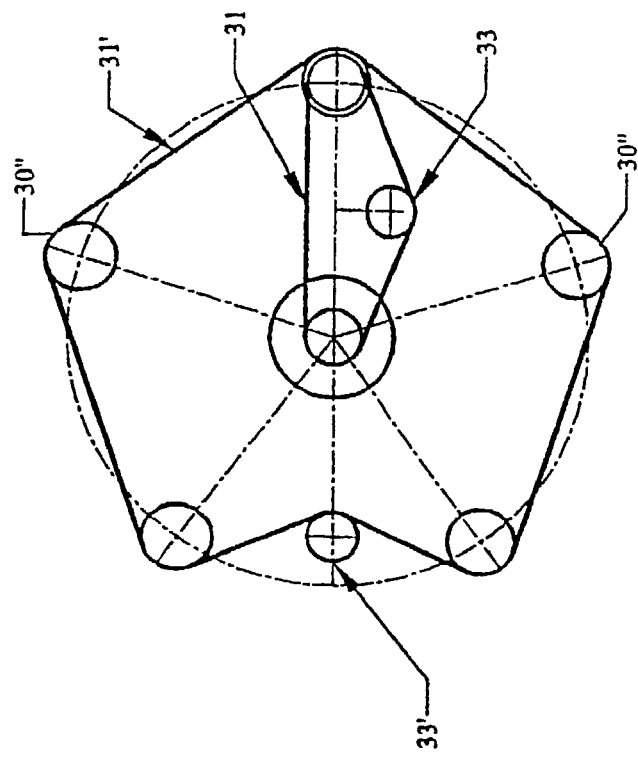
Fig.9B
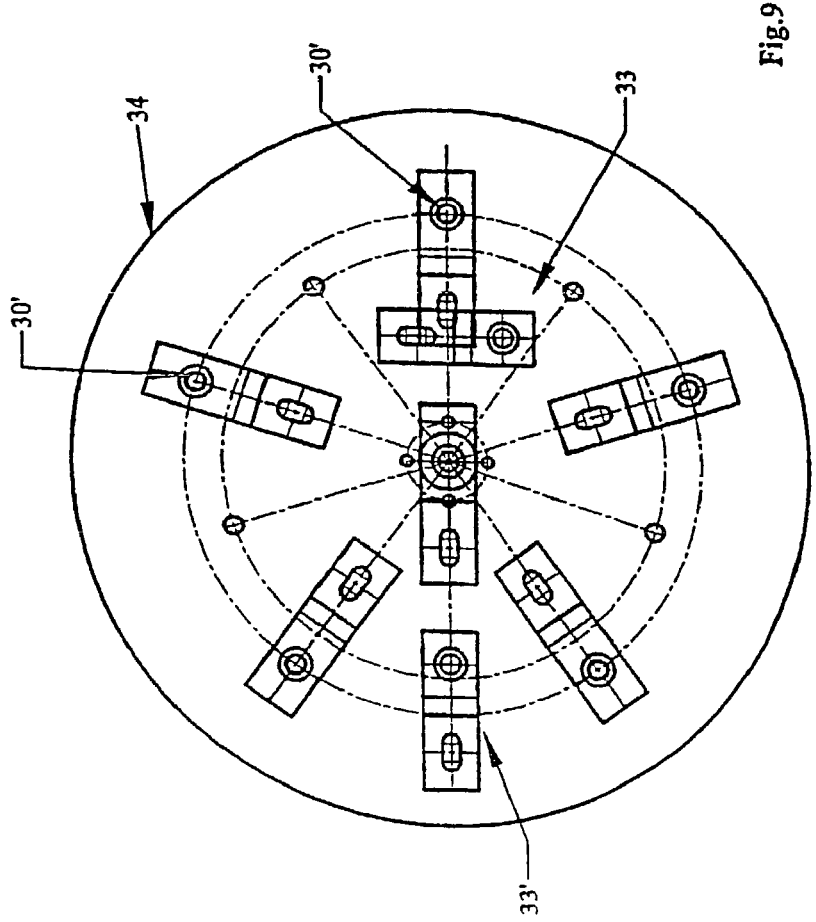
Fig.9
Fig.9A

MODULE AND APPARATUS FOR SYNTHESIS OF ORGANIC MOLECULES OR THE LIKE

The present invention relates to the field of synthesis of molecules, in particular organic, particularly in solid phase and in large number, and has for its object a module for the conduct of such syntheses, as well as an apparatus comprising at least one such module.

From EP-A-0 208 641, there is already known a semiautomatic multi-synthesizer of peptides in solid phase, comprising a plurality of individual reactors each connected to a volumetric measure and disposed to form several independent parallel synthesis paths. This apparatus can use only a single synthesis chemistry, either BOC, or Fmoc, and uses exclusively the so-called Merifield technique. Said reactors are disposed in open air and their parallel spaced arrangement results in a large total size.

Then, from FR-A-2 664 602, there is known a robot for the simultaneous synthesis of several identical or different peptides in solid phase.

This robot comprises a plurality of non-isolated reactors gathered on several plates and comprises mechanized movable means for the preparation and injection of solvents and amino acids.

There results an apparatus of complicated structure requiring continuous maintenance.

It should be noted that none of the above apparatus comprises means for controlling the temperature in the different reactors, nor for adjustment of said temperature as a function of the reactions in progress or to be initiated.

Moreover, an important multiplication of reactors in the mentioned apparatus for increasing performance, gives rise to a proportional increase in the complexity of the structure of the apparatus and the size of this latter, incompatible with laboratory use and requiring a rearrangement of the internal construction and arrangement of said apparatus.

Finally, the mentioned apparatus provide for decompacting, mixing and suspending in the present medium in said injection reactors, gas to carry out bubbling, which of course avoids the destruction of the support and the synthesis products, but can also prove to be insufficient in the case of important and intimate agglomeration and does not permit guaranteeing good homogeneity to a suspension of the solid/liquid medium in the different reactors.

The present invention has particularly for its object to overcome at least certain of the drawbacks mentioned above and to provide a solution permitting carrying out simultaneous syntheses of molecules, in particular organic ones, in solid phase, according to various methods or strategies of synthesis, in separate synthesis containers and subject particularly to identical and controlled physical or thermodynamic conditions, whilst permitting easy access to the interiors of said reactors and a modular association of a large number of synthesis containers without producing too complicated a structure.

To this end, the present invention has for its object a module for the synthesis of molecules that are organic or not, on or in solid phase, principally constituted by several, preferably at least two and at most ten, separate synthesis reactors, arranged according to a circular arrangement with equi-angular distribution and each formed of a tubular body forming a reaction chamber delimited in its internal portion by a removable porous wall, adapted to retain the material forming the synthesis support, by an injection and expansion head forming an upper closure plug for the tubular body, and by a closing and emptying base mounted removably in lower prolongation of the tubular body and ensuring peripheral sealed holding of the retention wall, each reactor being provided with a heat exchanger in intimate peripheral contact with the tubular body at least at the level of the portion of the chamber adapted to contain the medium and the reaction compounds and by a condenser in intimate peripheral contact with the body at the level of a portion of the chamber extending above that containing the medium and the reaction components and below the injection head, and said assembly of reactors being mounted in an insulating structure surrounding said reactors at least at the level of said exchangers and said condensers, the action of these latter being similar for all the reactors of the module and the insulation being homogeneous for all the reactors, such that said reactors will be subjected permanently to identical thermal conditions.

It also has for its object an apparatus for the synthesis of organic molecules in solid phase, operating automatically or semi-automatically, comprising at least one module of the mentioned type.

The invention will be better understood from the following description, which relates to a preferred embodiment, given by way of non-limiting example, and explained with reference to the accompanying schematic drawings, in which:

FIGS. 6A and 6B are respectively views from above and in longitudinal cross-section of a tubular body of a reactor;

FIG. 9A is a top plan view of the support structure and of the drive members for the rotatable agitation members shown in FIG. 1 and FIG. 9B is a schematic representation from above showing the arrangement of the movement transmission members, for example in the form of belts, for the rotatable agitation members of FIG. 1;

Figure 1:
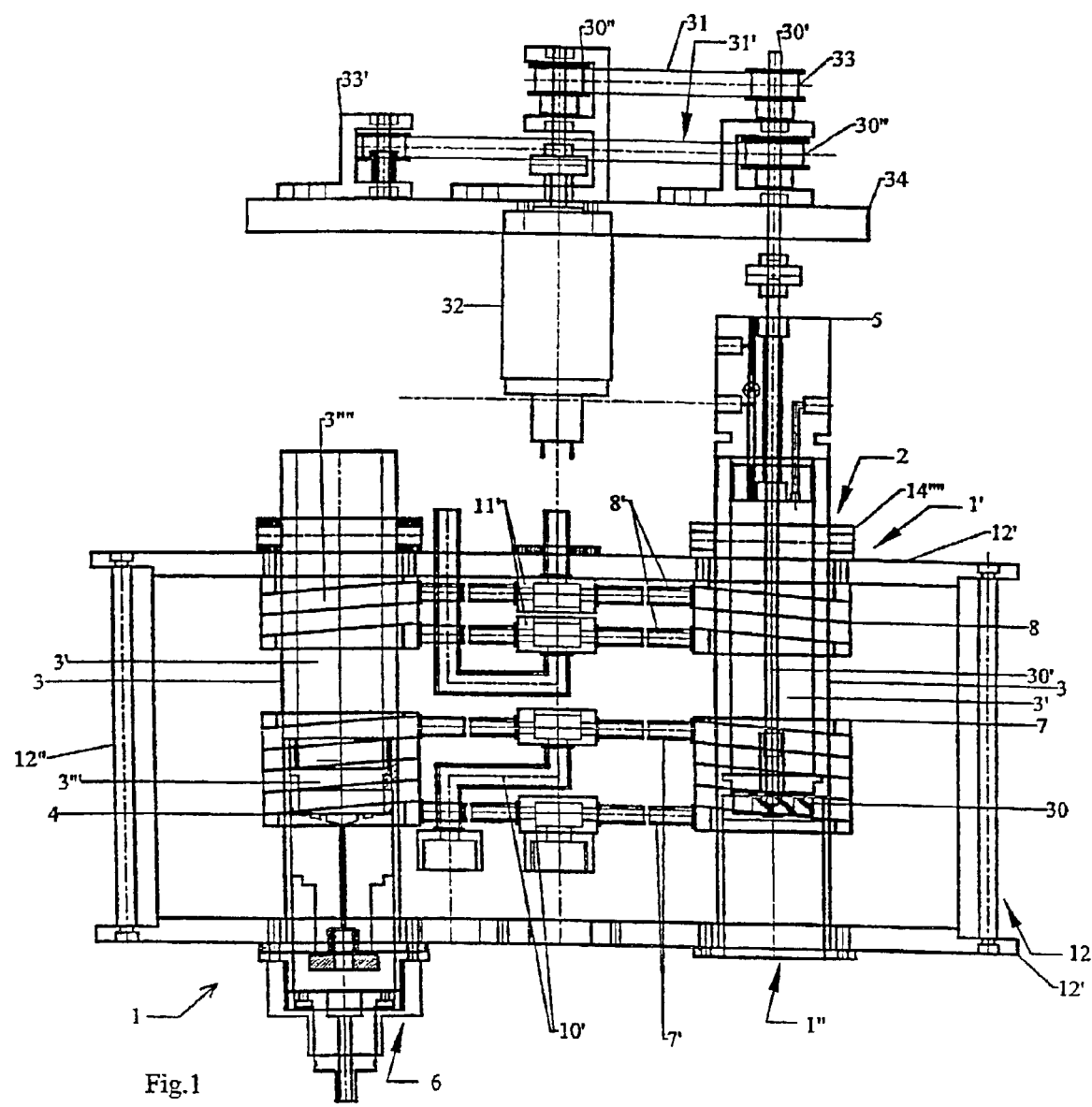
FIG. 1 is a partial side elevational view of a module according to the invention, without insulating structure, comprising only two reactors of which one has no base and the other no injection head and surmounted by the support structure carrying the rotatable agitation members and their drive members.

As shown more particularly in FIGS. 1 to 5 of the accompanying drawings, the module 1 for the synthesis of molecules, in particular organic ones, on a solid phase, for example on resin, has a compact and small structure, with optimum, regular and homogeneous arrangement of its different constituent elements, particularly of its reactors.

According to the invention, this module 1 is essentially constituted by several, preferably at least two and at most ten, separate synthesis reactors 2, arranged in a circular arrangement with equi-angular distribution and each formed by a tubular body 3 forming a reaction chamber 3' delimited in its lower portion by a removable porous wall 4, adapted to retain the material forming the synthesis support, by an injection and expansion head 5 forming an upper closure plug for the tubular body 3, and by a closure and emptying base 6 mounted removably in lower prolongation 3" of the tubular body 3 and ensuring the peripheral sealed holding of the retention wall 4, each reactor 2 being provided with a heat exchanger 7 in intimate peripheral contact with the tubular body 3 at least at the level of the portion 3''' of the chamber 3' adapted to contain the medium and the reaction compounds, and by a condenser 8 in intimate peripheral contact with the body 3 at the level of a portion 3"" of the chamber 3' extending above the portion 3''' containing the medium and the reaction components and below the injection head 5, and said assembly of reactors 2 being mounted in an insulating structure 9 surrounding said reactors 2 at least the level of said exchangers 7 and said condensers 8, the action of these latter being similar for all the reactors 2 of the module 1 and the insulation being homogeneous for all the reactors 2, such that said reactors 2 will be continuously subjected to identical thermal conditions.

Preferably, the module 1 will comprise between three and seven reactors 2, each of these latter having for example an internal volume of about 60 ml for a useful volume of about 20 ml.

Figure 4:
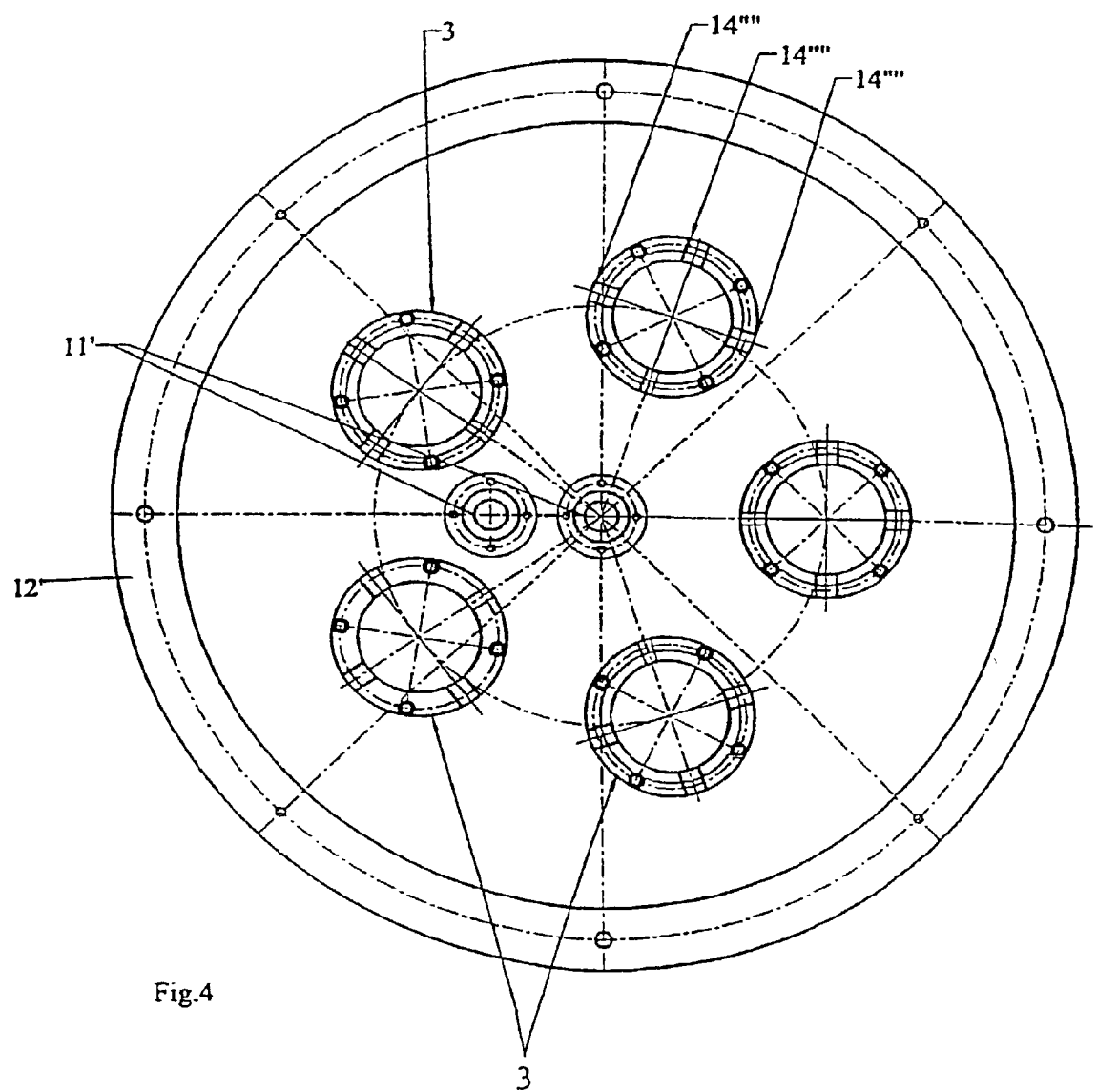
FIG. 4 is a top plan view of the object shown in FIG. 2.
Figure 5:
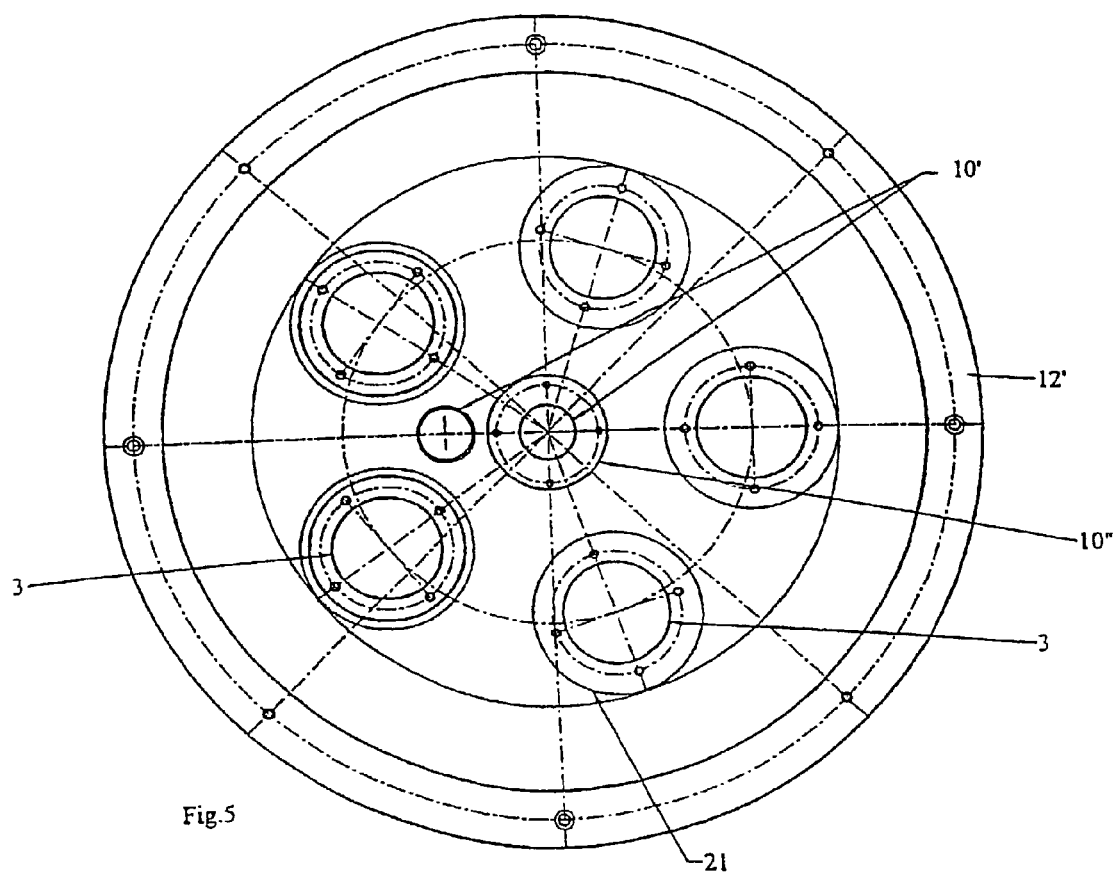
FIG. 5 is a bottom plan view of the object shown in FIG. 2.

As shown in FIGS. 4 and 5 of the accompanying drawings, these reactors are arranged according to a circular arrangement and with equi-angular distribution (constant angular spacing between two neighboring reactors).

Each tubular body 3 will have a sufficiently small thickness to ensure rapid thermal transmission between the exchanger 7 and the condenser 8 mounted on the exterior of said body and the interior of this latter, and a length sufficient to permit a large temperature gradient between the wall portions in contact with the reaction medium and the ends of said bodies in contact with the base 6 and the injection head 5, with limited loss by longitudinal transmission.

The tubular body 3, as well as its prolongation 3" formed in a single piece with it, will be made of a material resistant to a wide range of negative and positive temperatures, to variations and gradients of temperature of large value, as well as to the reaction substances and to the products derived or synthesized that may be obtained. Polytrifluorochlorethylene satisfies the mentioned criteria and could for example form the body 3 and its prolongation 3" as well as the injection head 5 and the portions of the base 6 in contact with the reaction medium.

To be able to carry out effective condensation in association with substantial heating, the condenser 8 and the exchanger 7 of a same reactor 2 are physically separated and mounted on this latter with mutual longitudinal spacing, as the case may be with interposition of an insulating material, and connected to lines 10, 11 for supply and evacuation of separate heat exchange liquid or liquids, the temperature of the fluid, preferably liquid, for the condensers 8 being adapted to vary from ambient temperature to about 15° C. (for example water delivered by the public distribution network) and the temperature of gaseous fluid for the exchanger 7 can vary between about −80° C. and about −100° C., which permits establishing ideal temperature conditions for all the usual reactions in organic chemistry.

Figure 2:
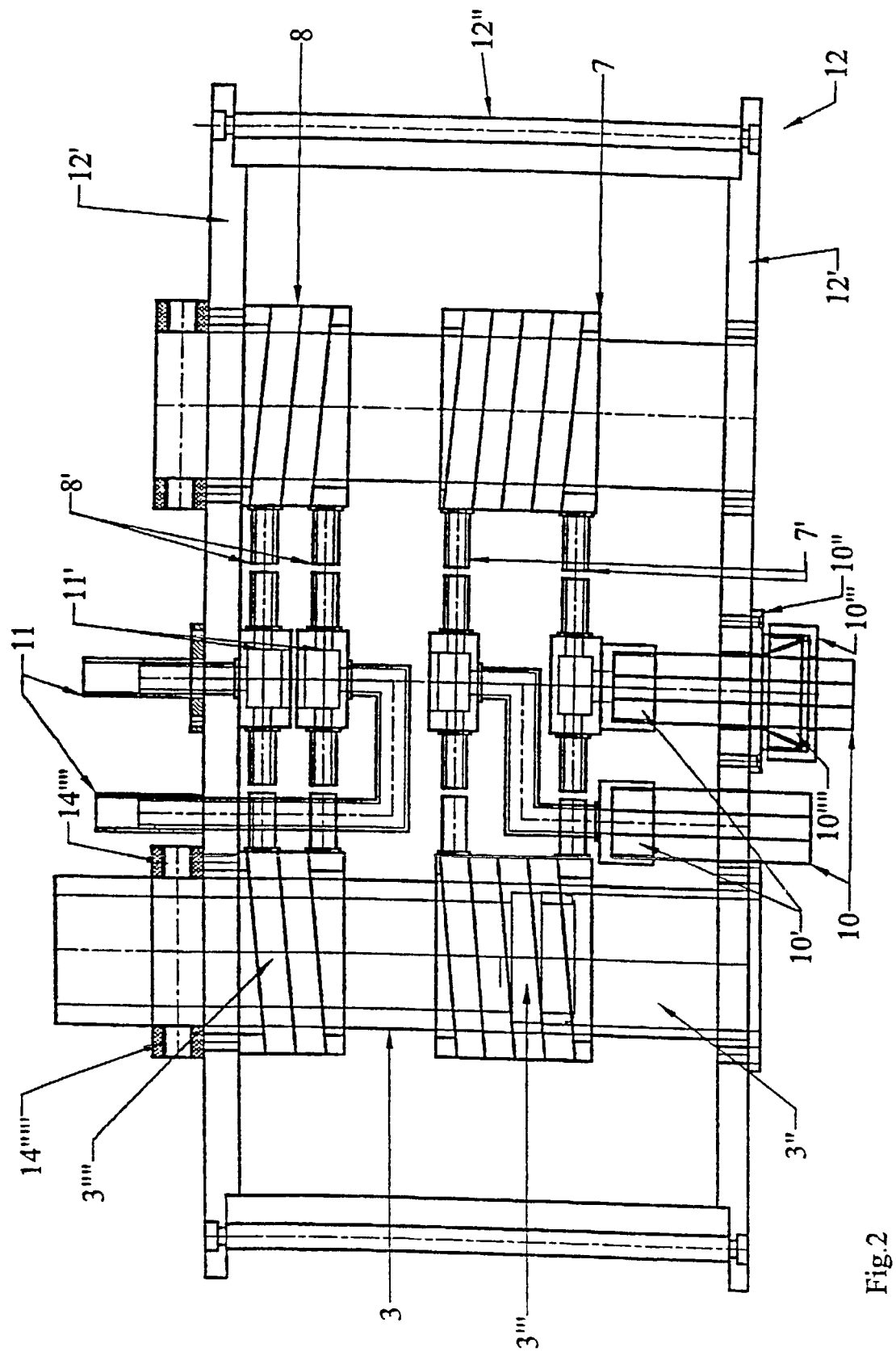
FIG. 2 is a view similar to that of FIG. 1 showing more particularly the exchanger and condenser and the assembly and support structure.
Figure 3:
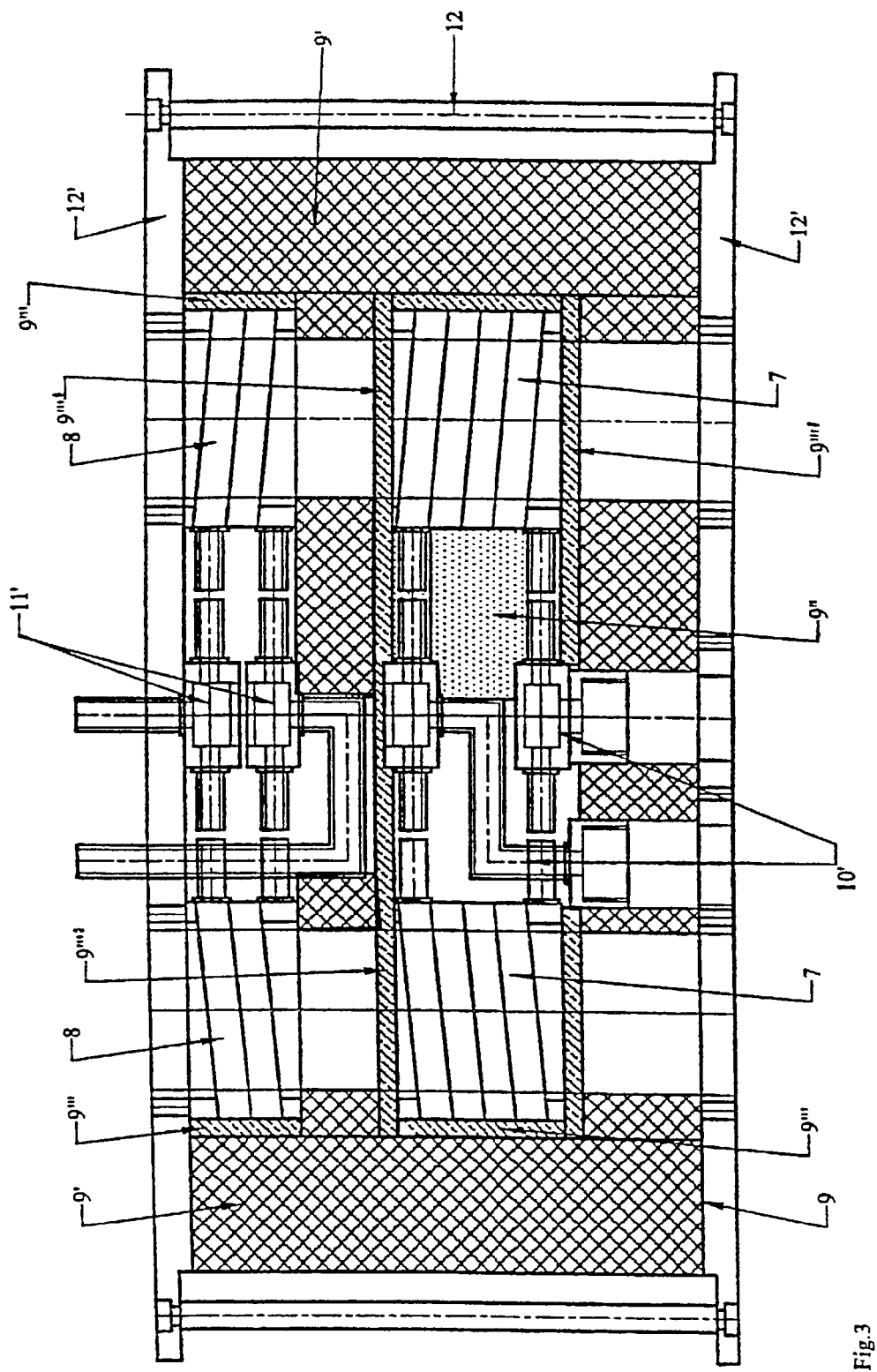
FIG. 3 is a view similar to that of FIG. 2 showing moreover the insulating structure.

According to a preferred embodiment of the invention, shown in FIGS. 1, 2 and 3 of the accompanying drawings, the condensers 8 and the exchangers 7 are each constituted by a plurality of helicoidal adjacent turns of a metallic conduit of rectangular or square cross-section, the fittings 7', 8' for supply and evacuation of all the condensers 8 and exchangers 7 being radially inwardly directed of the circular arrangement formed by the assembly of reactors 2 and connected to central portions 10', 11' for radial connection and distribution of supply and evacuation lines 10, 11 of heat exchange fluid or fluids, the supply and evacuation lines 10, 11 being connected at their central connection and distribution portions 10', 11' on the two opposite surfaces or sides 1', 1" of said module 1 and the configuration of said central portions 10', 11' giving rise to equivalent pressure drops and equivalent circulation paths, on the one hand, for all the condensers 8, and, on the other hand, for all the exchangers 7.

The different exchangers 7 and condensers 8 with their respective central portions 10' and 11' will constitute two circulation circuits of fluids, with a rigid structure.

The supply and evacuation lines 10 connected to the central portions 10' are thermally insulated and could for example consist of lines known by the term "dewar".

The connection of the lines 10 to the connection fittings of the central portions 10' could for example be carried out by means of a self-blocking and thermal insulating holding and securement assembly as shown in FIG. 2. This assembly comprises a casing 10" secured to the corresponding fitting and provided with a truncated conical opening adapted to receive the end of a conduit of the line 10. An annular insert 10''', of wedge shaped cross-section, and for example in two parts, is forcibly inserted between the conduit and the internal surface of the opening of the casing under the action of a nut 10"" engaging on external screw threading provided on the casing 10" (see FIG. 2).

The insert 10''' consists of a rigid material with thermal insulating properties and the mentioned mounting ensures the holding and blocking of the conduit of the line 10, as well as a rigidification of the structure of the assembly of the module 1.

A central supply relative to the reactor assembly 2 permits obtaining equal distribution between the different exchangers 7 and condensers 8 and hence equivalent heat transfers at the level of the different reactors 2.

Moreover, the opposite supply connection directions (FIG. 2: downwardly for the exchangers 7 and upwardly for the condensers 8) avoids any contact between the two circulation circuits and prevents any disturbing heat transfer between them.

Preferably, the exchangers 7 and condensers 8, with their connection and distribution portions 10', 11', could be made of nickel copper.

As shown in FIGS. 3 to 5 of the accompanying drawings, the module 1, and more particularly the insulating structure 9, has an external shape of a flat cylinder, permitting access to the bases 6 and leaving the injection heads 5 exposed. Said structure is mounted and comprised between two separate parallel disc-shaped plates 12' connected by cross members 12" and forming together an assembly and support structure 12 on which are mounted the tubular bodies 3 of the synthesis reactors 2, said structure 12 being, as the case may be, covered or surrounded peripherally or over all its external surface, with a film, a sheet, a plate or the like of material that reflects thermal radiation and having vapor protective properties and said structure 12 carrying if desired said exchangers 7 and/or condensers 8 and/or a portion of their supply and evacuation lines 10, 11.

The latter could, particularly as to the supply lines, and as the case may be the evacuation lines of the exchanger 7, be preferentially thermally insulated over all their length and the connection with the central connection and distribution portions 10' could take place within the mass of the insulating structure 9 to limit outward losses (see FIG. 3).

The disc-shaped plates 12' could, as the case may be, also be covered with a vapor-resistant material.

According to one embodiment of the invention, shown more particularly in FIG. 3, the insulating structure 9 is constituted, on the one hand, by portions of rigid insulating material 9', for example polyisocyanurate foam, peripherally surrounding the assembly of reactors 2 and forming substantially a ring about this latter, and, on the other hand, by an insulating material 9" that is pulverulent or formed of balls of small diameter, for example of perlitic rhyolite, contained in the ring formed by the portions of rigid insulating material 9' and filling the free volumes between the bodies 3 of the different reactors 2, the exchangers 7 and the condensers 8, the assembly of the exchangers 7, and the case may be, the assembly of the condensers 8, being adapted to be surrounded peripherally by one or several layers of ceramic cloth 9''', forming insulating protective walls between these elements 7, 8 and the internal surface of the ring of rigid insulating material 9', the exchangers 7 being, as the case may be also sandwiched between two discs 9''' of ceramic cloth so as completely to enclose said exchangers in a cocoon of ceramic cloth.

The insulating walls formed by the ceramic cloth (for example of the Fiberfrax Paper type—trademark) permit generating a temperature differential between the exchangers 7/condensers 8 and the portions of rigid insulating material 9' which, in addition to the supplemental insulation that is obtained, will avoid subjecting these latter to too great temperatures.

As a modification, there can be provided to pour a suitable insulating foam material between the disc-shaped plates 12' and the reactors 2, which material upon expanding will fill all the empty volumes between the constituent elements.

As shown in FIGS. 1, 2, 4, 6A, 6B and 7 of the accompanying drawings, each tubular body 3 comprises, on the one hand, at the level of its interface with its lower prolongation 3", a projecting internal ring 13 forming a circumferential abutment for blocking and peripheral sealing gripping of the retention wall 4 of the material forming a synthesis support, for example in the form of a disc-shaped filter, and, on the other hand, several longitudinal conduits 14, 14', 14" for injection or passage, hollowed within the thickness of its wall and extending from the upper edge of said body 3, or at least from an upper portion of the body 3 located beyond the insulating structure 9, to the level of the portion 3''' of the reaction chamber 3' adapted to contain the reaction medium and compounds, opening or not above said projecting internal ring 13 has an annular hollowed reinforcement 14''' or formed in said wall.

Among the mentioned conduits distributed circumferentially in the wall of the body 3, at least two serve for conveying substances that are to be delivered directly into the portion 3''' of the chamber 3' containing the reaction medium, slightly above the woven filter forming the porous retention wall 4.

Thus, one 14 of the conduits could serve for the injection of the resin that supports synthesis (the conduit 14 will have a diameter suitable to this injection and will avoid stoppering of other conduits or of the injection head 5), another 14' for the injection of the synthons and/or the coupling reagents (injection without loss of substances in small quantity and delivering without pollution directly into the medium). A third conduit 14" will serve for the introduction of a monitoring member for the temperature of the reaction medium, such as a filamentary thermocouple. This conduit 14" will not be plugged and will extend preferably to a distance permitting positioning of the measuring head in a median position relative to the reaction medium.

It will be noted that the construction of the conduits 14 and 14' permits effective and complete cleaning by simple injection of solvent through them (absence of external surface, no portion unexposed to the flow). Moreover, the unstoppering of the conduits 14, 14' adjacent the filter 4 permits evacuation of most of the medium through these conduits during gaseous pressurization of the chamber 2', without risk of closure (particularly for the conduit 14).

The mentioned conduits could preferably communicate at their upper ends through lateral or radial conduit portions associated with supply sites or fittings 14'''' (FIG. 1).

Figure 7:
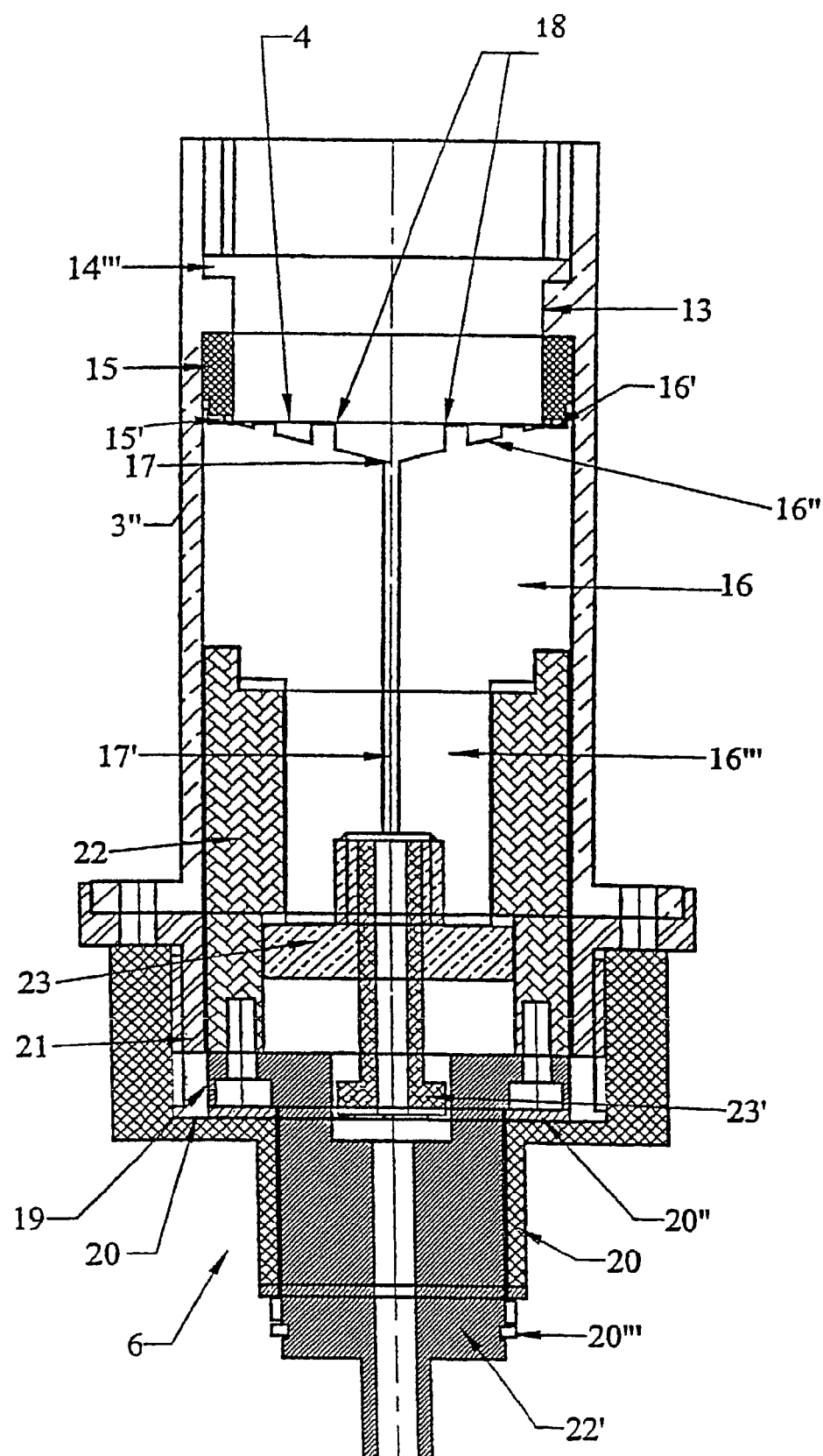
FIG. 7 is a detailed view, on a different scale, of the base shown in FIG. 1.

To obtain sealed closure in the lower portion of the reactor, whilst having the possibility of freeing and opening in the prolongation 3" over all the width of this latter and of being able rapidly to exchange the porous retention wall 4, each base 6 is preferably constituted, on the one hand, by a bearing and sealing ring 15 mounted with locked adjustment and blockage in translation in the direction of the upper portion of the reactor 2 in question, for example against a projecting internal ring 13, in tubular prolongation 3" of the tubular body 3 of said reactor 2 and provided with at least one circumferential rib 15' for peripheral gripping of the wall 4, on the other hand, by a support and compression body 16 for the compressible porous retention wall 4 comprising, on the side directed toward said wall 4, a flat external circumferential bearing surface 16' facing the rib or ribs 15' of the ring 15 and an internal conical surface 16" inclined toward a central evacuation opening 17 connected to an axial emptying channel 17' hollowed out in said body 16 and provided with protuberances 18 for supporting the porous retention wall 4 and, finally, by a removable assembly 19, 20 for locking the support and compression body 16 against the support ring 15 and the connection of a conduit or tubing to the outlet of the emptying channel 17' (FIGS. 1 and 7).

The inwardly projecting ring 13 could be formed at the interface of the tubular body 3 and its lower prolongation 3", the ring 15 being forcibly mounted in said prolongation 3' and the body 16 having an external flange coming into coacting engagement with an external recess of complementary shape formed at the lower edge of said ring 15.

It will be noted that the axial emptying channel 17' could, as the case may be, be used for injection of gas for bubbling purposes.

Moreover, said channel 17' could also serve for the extraction of the synthesis products after their cleavage on the synthesis support.

As also shown in FIG. 7 of the accompanying drawings, the removable gripping assembly could be comprised by a member 19 for guidance and transmission of the pressure forces between a nut 20, preferably double screw-threaded and with a Z-shaped cross-section, engaging by screwing with a screw-threaded casing 21 secured to the prolongation 3" of the tubular body 3 and the support and compression body 16 of the retention wall 4, comprising a first hollow cylindrical portion 22 coming into contact, shape-matingly, against the rear surface of the support and compression body 16 by axially guiding a rear prolongation 16''' of said body 16 on which is mounted a connection member 23 of a connection fitting 23' of a conduit or tube adapted to be connected to the axial emptying channel 17', and a second cylindrical portion 22' comprising a portion forming a washer interposed between the first cylindrical portion 22 and a force application surface 20' of the nut 20 and a cylindrical portion prolonging said portion forming a washer and ensuring the guidance of the nut 20 relative to the member 19 for guidance and transmission of forces and for holding and guiding an adjacent portion of the conduit or tube connected to the axial emptying channel 17'.

If desired, a force transmission washer 20" could be provided between the surface 20' of the nut 20 and the second cylindrical portion 22', this latter being adapted to receive on its end extending beyond the nut 20, a circlip or stop 20''' engaged by said nut during its unscrewing and driving the second and first hollow portions 20 and 20', trapping the connection fitting 23', this latter in turn driving the member 23 and the body 16 with the same retraction movement.

Figure 8:
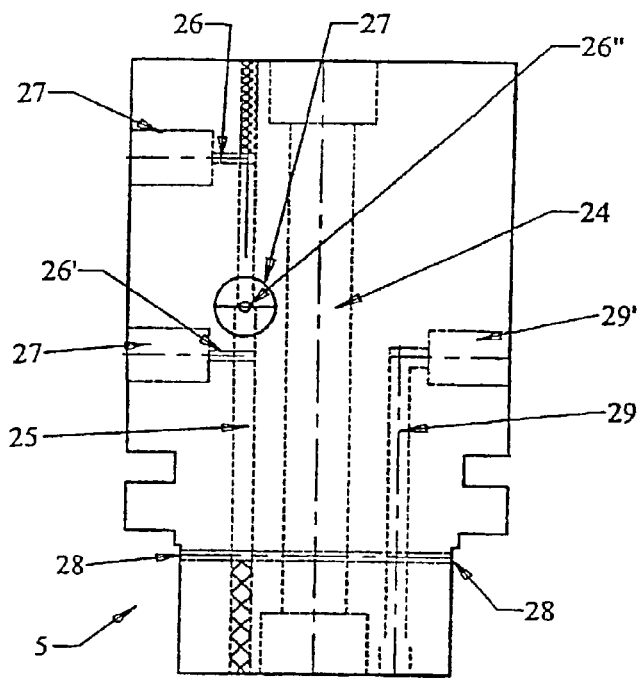
FIGS. 8A, 8B and 8C are respectively views in side elevation, from above, and from below, of the injection head shown in FIG. 1.
Figure 8:
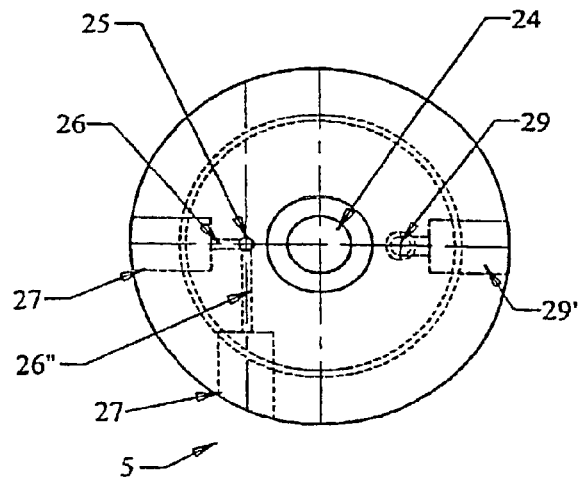
Figure 8:
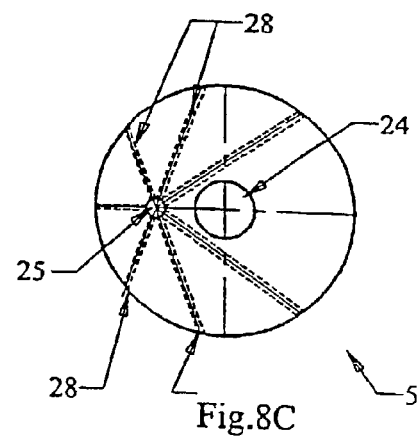

According to a characteristic of the invention and as shown in FIGS. 1 and 8 of the accompanying drawings, the injection head 5 preferably comprises, on the one hand, an axial through passage 24 for the mounting with ease or rotation of an element in the form of a rod 30', on the one hand, a principal injection channel 25 that is eccentric and connected upstream to several supply channels 26, 26', 26" prolonging lateral sites 27 for connection of conduits or tubes for delivering fluid or fluids and opening into said injection channel 25 at positions offset along this latter and, downstream, to radial distribution channels 28 extending from the downstream end of said injection channel 25 and opening adjacent the upper edge of the internal surface of the wall of the upper portion of the tubular body 3 of the reactor 2 in question, with regular distribution and substantially equivalent pressure drops, and, finally, by an eccentric channel 29 for expansion and evacuation of the gaseous fluids, opening on the lower surface of the injection head 5 and connected to a lateral site 29' for corresponding external connection.

Such an embodiment of said channels 28 permits carrying out particularly, by distributed injection of suitable solvent, a washing by aspersion and leaching of all of the internal surface of the wall of the tubular body 3.

To obtain substantially equal pressure drop for the different channels 28, these latter will have diameters proportional to their lengths (constant length/diameter ratio).

The supply channel 26 opening farthest upstream (relative to the direction of injection) on the principal injection channel 25, will preferably be reserved for the injection of the solvent, particularly the washing and rinsing solvent, which will permit cleaning the channel 25 over all its length and provided liquid plugs in this latter, the supply channels 26', 26' and 26" and the channels 28 can be maintained during all the duration of one phase or of one synthesis procedure, limiting the retro contaminations and being adapted to be injected into the chamber 3' after the synthesis phase under the pressure of a quantity of supplemental solvent.

The supply channel 29 will serve the principal office of expansion outlet for the gases present or forming during synthesis reactions, and, as the case may be, for the pressurizing channel of the chamber 3' during expulsion and extraction of the products contained in this latter.

The pressurization of the reactor 2 can also be carried out by means of the solvent injection channel 26, which moreover offers the advantage of easy cleaning and the possibility of emplacement of liquid plugs.

To be able to actuate the reaction by mixing, this agglomeration of the decanted and homogenized substances of the reaction medium, no matter what the condition of agglomeration of this latter, each reactor 2 is provided with a rotating member 30 for mechanical agitation of the medium or mixture contained in the reaction chamber 3' in question, in the form of a helix located at a small distance above the retention wall 4 of the synthesis support and mounted on the end of a rod 30' forming a shaft or axle passing through the injection head 5 at the level of an axial passage 24 adapted and provided at its opposite end with a notched pulley 30" or with similar element for its driving by a member 31' for transmission and distribution of movement, for example of the notched belt type, interconnecting the pulleys 30' of the agitation members 30 of the different reactors 2 of the module 1, the synchronous rotation of the different agitation members 30 being assured by a variable speed motor 32 directly or indirectly driving said transmission and distribution member 31 and mounted, together with said pulleys 30" and said member 31, as well as if desired with the return pulleys and one or more belt tighteners 33, 33' on a suitable support structure 34, in a removable manner, on the module 1 (FIGS. 1, 9A and 9B).

The blades of the helix 30 are preferably inclined to have a lower edge located forwardly relative to the direction of rotation of said helix 30, as well as the lower portion of the rod 30', particularly that immersed in the reaction medium, are clad with a chemically resistant and thermally insulating material.

It will be noted that the use of a helix 30 slightly offset relative to the surface of the wall 4 and adapted to be driven at different speeds, permits more effective decompacting than a simple bubbling whilst not scraping the synthesis support and the products which are attached thereto, as a magnetic barrel would.

The rod 30' will of course be mounted at the level of the axial passage 24 in hermetically sealed bearings.

As shown in FIGS. 1 and 9B of the accompanying drawings, the motor 32 could, to reduce the overall size, be disposed between the support structure 34, for example in the form of a plate, and the upper disc-shaped plate 12' of the support structure 12 of the module 1 and the transmission would take place in two stages, a first stage comprising a primary belt 31 for transmission between the axle or shaft of the motor 32 and a principal drive pulley or the return mounted coaxially on a rod 30' with a secondary pulley 30" offset longitudinally, said secondary pulley 30" transmitting the movement to the other pulleys 30" (mounted on rods 30' provided with members 30) by the transmission member 31' (distribution belt) and forming with them and this latter the second transmission stage.

The support structure 34, as well as the constituent elements of the support structure 12, could for example be made of aluminum or an anodized aluminum alloy.

The module 1 described above and of which one embodiment is shown in FIGS. 1 and 9 of the accompanying drawings, is adapted to constitute the fundamental modular element of a synthesis apparatus for organic molecules or the like, alone or in association with other modules 1 of the same type.

Those skilled in the art will particularly notice the polyvalence of use of such a module 1 in terms of technique or synthesis protocol that can be carried out (combination chemistry, parallel or the like) and of varieties of environmental materials that can be constructed about such a module or modules (injection circuits, emptying circuits, expansion circuits, pressurizing circuits, heating circuits, cooling circuits, refrigeration circuits, . . . ).

Thus, as to the nature of connections and destination of the injection sites, supply sites and evacuation sites are respected, said module 1 could serve as an instrument or tool for synthesis in very diverse applications.

The present invention also has for its object an apparatus for the synthesis of organic molecules in solid phase, with automatic or semiautomatic functioning comprising at least one module 1 as previously described.

Figure 10:
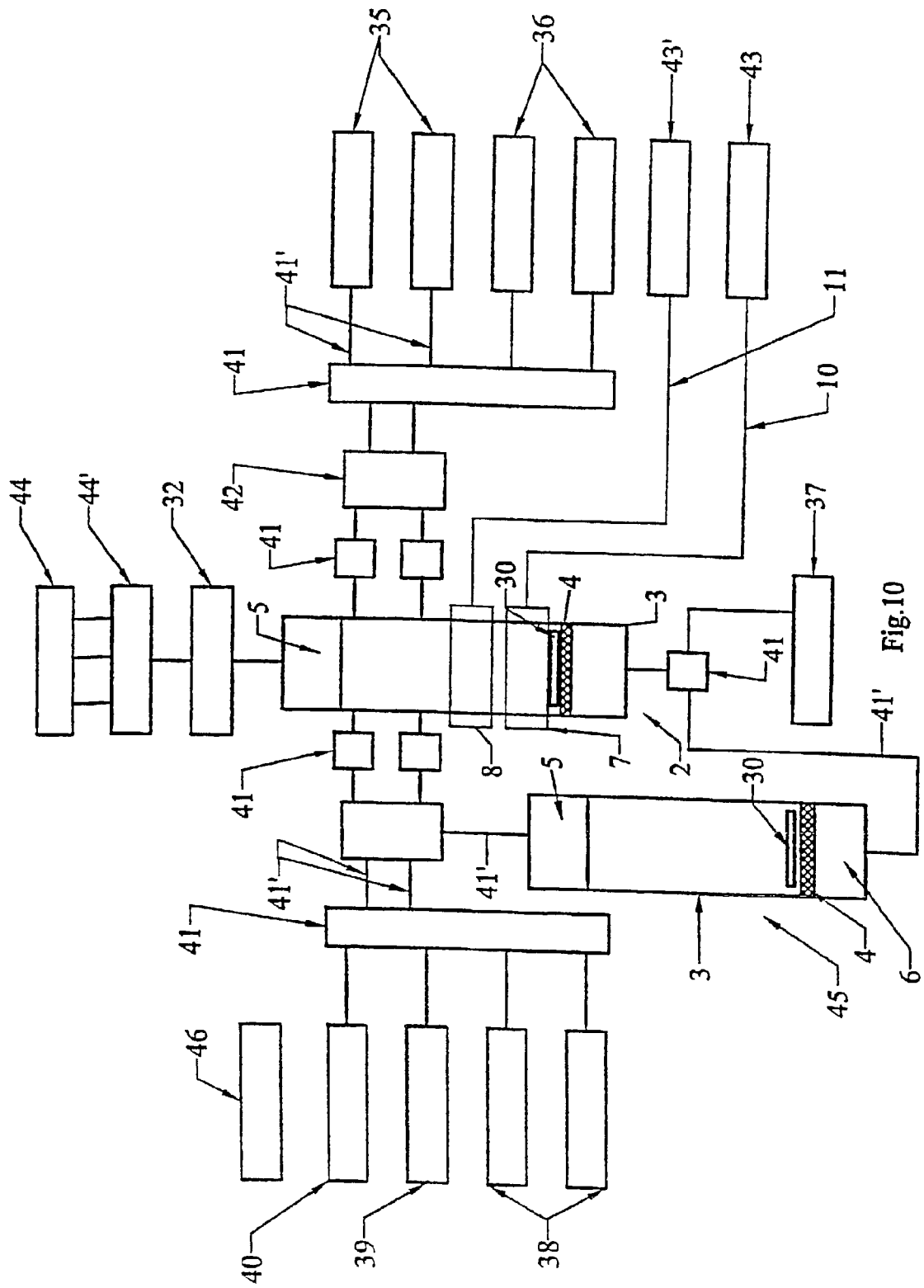
FIG. 10 is a synoptic representation of a synthesis apparatus according to the invention.

As shown schematically in FIG. 10 of the accompanying drawings, in such an apparatus said module or modules 1 could, for example, in a non-limiting embodiment, be connected, on the one hand, at the level of the reactors 2, of the reservoirs 35, 36, 37, 38, 39, 40 for solvents, compounds or elemental substances for syntheses, synthesis support substances, reagents, substances for emptying, for recovering of waste, for expansion or the like, by means of a distribution and transfer network constituted by a network of conduits or tubes 41' interconnected with single path or multi-path units 41 of membrane valves, also integrating volumetric measures 42, the movement of the fluids in said network taking place under the action of gas under pressure, for example argon or nitrogen, whose application for pressurizing different fluid segments is controlled by predetermination sequential actuations of suitable valve units 41, the opening times of said valves determining the volumes transferred, and, on the other hand, in the exchangers 7 and condensers 8, supply units 43, 43' for heat exchange cooling or heating fluid or fluids by suitable supply circuits formed by supply and evacuation lines 10, 11, said apparatus comprising moreover a computer unit 44 for control and management of the actuation of the different units of membrane valves 41 and of the operation of the supply units 43, 43' for gaseous heat exchange fluid or fluids, by means of suitable interface and multiplexing circuits 44' permitting effecting parameters in terms of sequences of synthesis and a selection between entirely automatic operation or semiautomatic operation, step by step, of said apparatus.

For reasons of simplicity and ease of comprehension, FIG. 10 of the accompanying drawings shows only a single reactor 2, it being noted that each reactor 2' of a module 1 will have similar connections.

In FIG. 10, there will be seen particularly:
various reservoirs 35 for de-protection reagents or the like;
various reservoirs 36 for synthons, secondary synthons and coupling reagents;
one or more reservoirs 37 for collecting waste, associated with a separation and extraction unit for the liquid phase (not shown);
an inlet/outlet system 38 for the synthesis support resin connected to the conduit 14 (the introduction of fresh resin at the beginning, cleavage, mixing/distribution, transfer . . . );
reservoirs 39 for washing solvents;
an expansion reservoir 40;
a reservoir or source 46 of inert gas under pressure, for the transfer by gaseous pressure of the fluids in the different distribution and emptying circuits under pressure of the different containers, the connections between this source or reservoir 46 not being shown for reasons of simplicity.

In FIG. 10 are also not shown the interface for dialogue and programming of the computer unit 44, the various connections of the circuits 44' with different control members (particularly the valve units 41), different monitoring modules (monitoring the reflux, temperature or the like), necessary for the automatic functioning of the apparatus, and whose construction is known to those skilled in the art.

A structure of synthesis apparatus for molecules that can serve as a base for the design and production of a structure of apparatus according to the invention is in particular described in French patent application No. 2 664 602 mentioned above, particularly with respect to FIGS. 2 and 3 of this latter.

Moreover, the valve units 41 will preferably have a construction similar to that described and shown in French patent application No. 2 664 671.

Preferably, the computer unit 44 also monitors the operation of the motor 32 driving the mechanical agitation members 30 in the form of helices, with controlled operation at at least two different speeds of rotation, namely a low speed for suspension and homogenization of the reaction mixture and a high speed for generating of a vortex adapted to ensure decompacting of the synthesis support.

The generation of a vortex will permit the choice of agglomerants present among themselves and against the internal wall of the reaction chamber 3' a gentle and progressive de-agglomeration, without breaking or scraping.

As shown in FIGS. 10 to 13 of the accompanying drawings and according to a supplemental characteristic of the invention, the synthesis apparatus could moreover comprise several modules 1 and in that each module 1 is associated with a container 45 forming an exchange and distribution chamber, whose internal volume corresponds to the sum of the internal volumes of the reactors 2 of the module 1 with which it is associated, whose construction is identical to those of said reactors 2 except for the size of the constituent elements, can be connected to said reactors 2 by a portion of the distribution and transfer network comprising at least one multi-path unit 41 of membrane valves and, as the case may be, provided with a mechanical agitation member 30, with a heat exchanger 7, a condenser 8 and thermal insulation over at least a portion of its tubular body 3.

Figure 11:
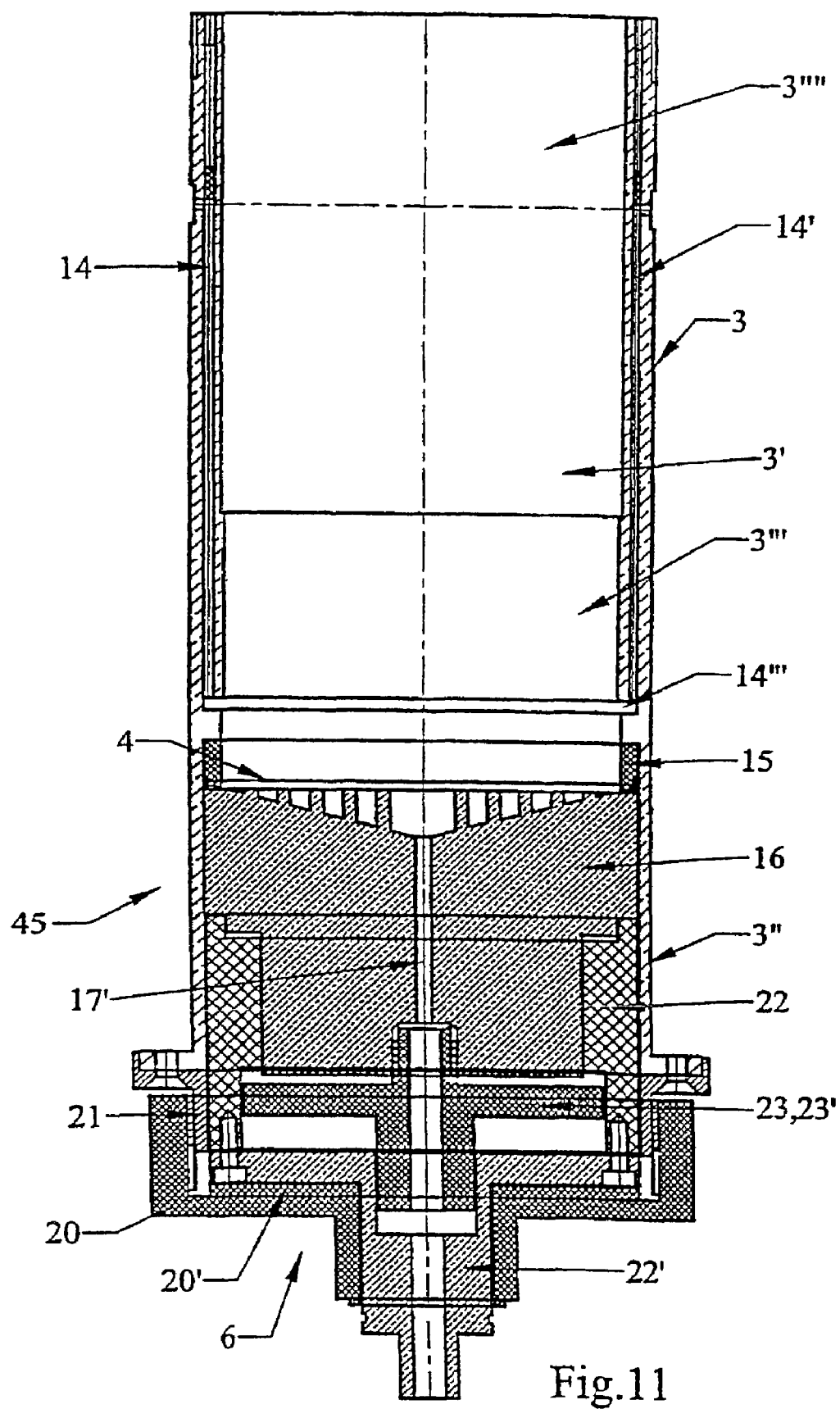
FIG. 11 is a cross-sectional and side elevational view of the tubular body and the base of a container forming an exchange and distribution chamber and forming a portion of the synthesis apparatus shown in FIG. 10.
Figure 12:
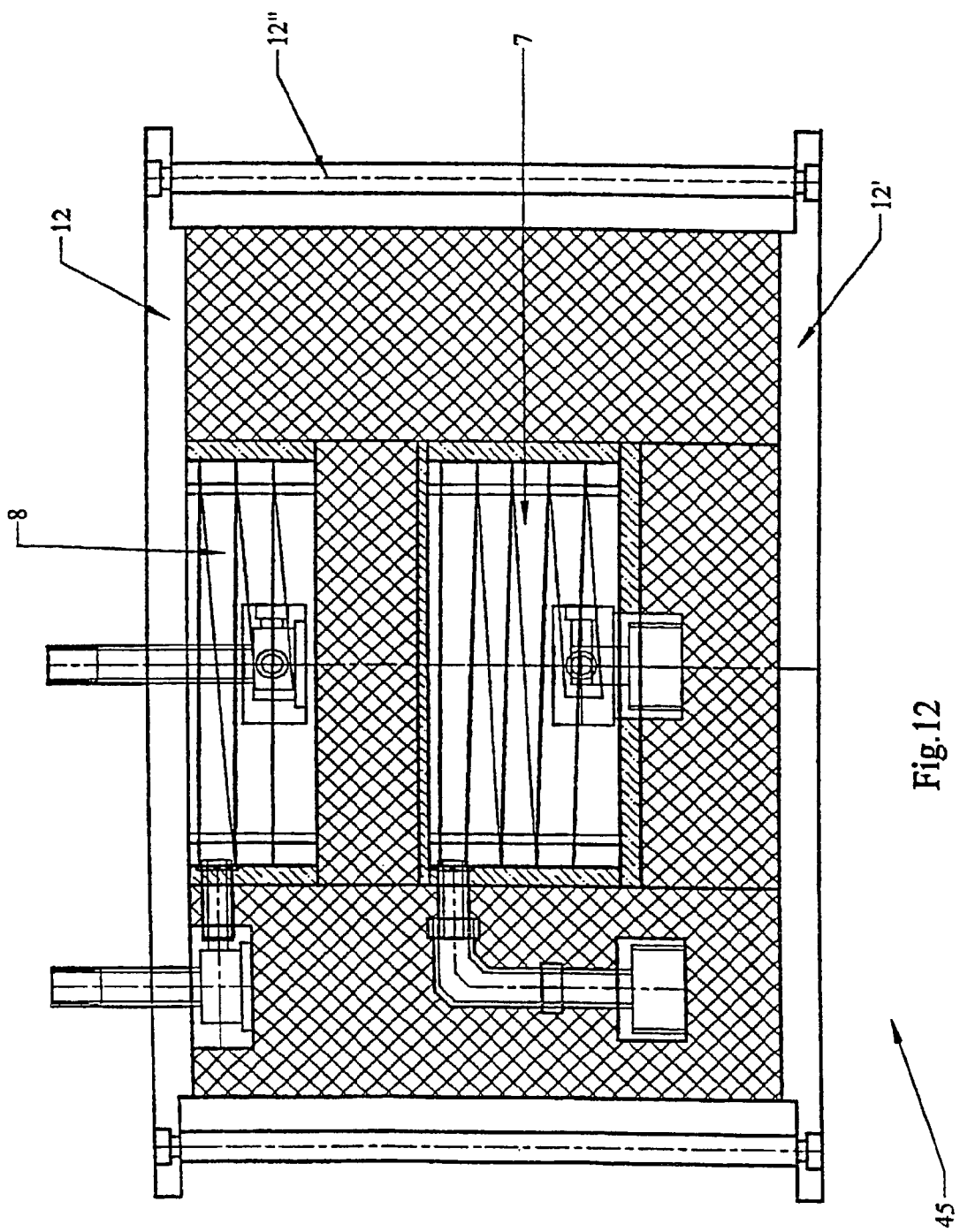
FIG. 12 is a side elevational view by transparency and partially in cross-section, of an exchanger/condenser/insulating structure assembly for a container of the type shown in FIG. 11.
Figure 13:
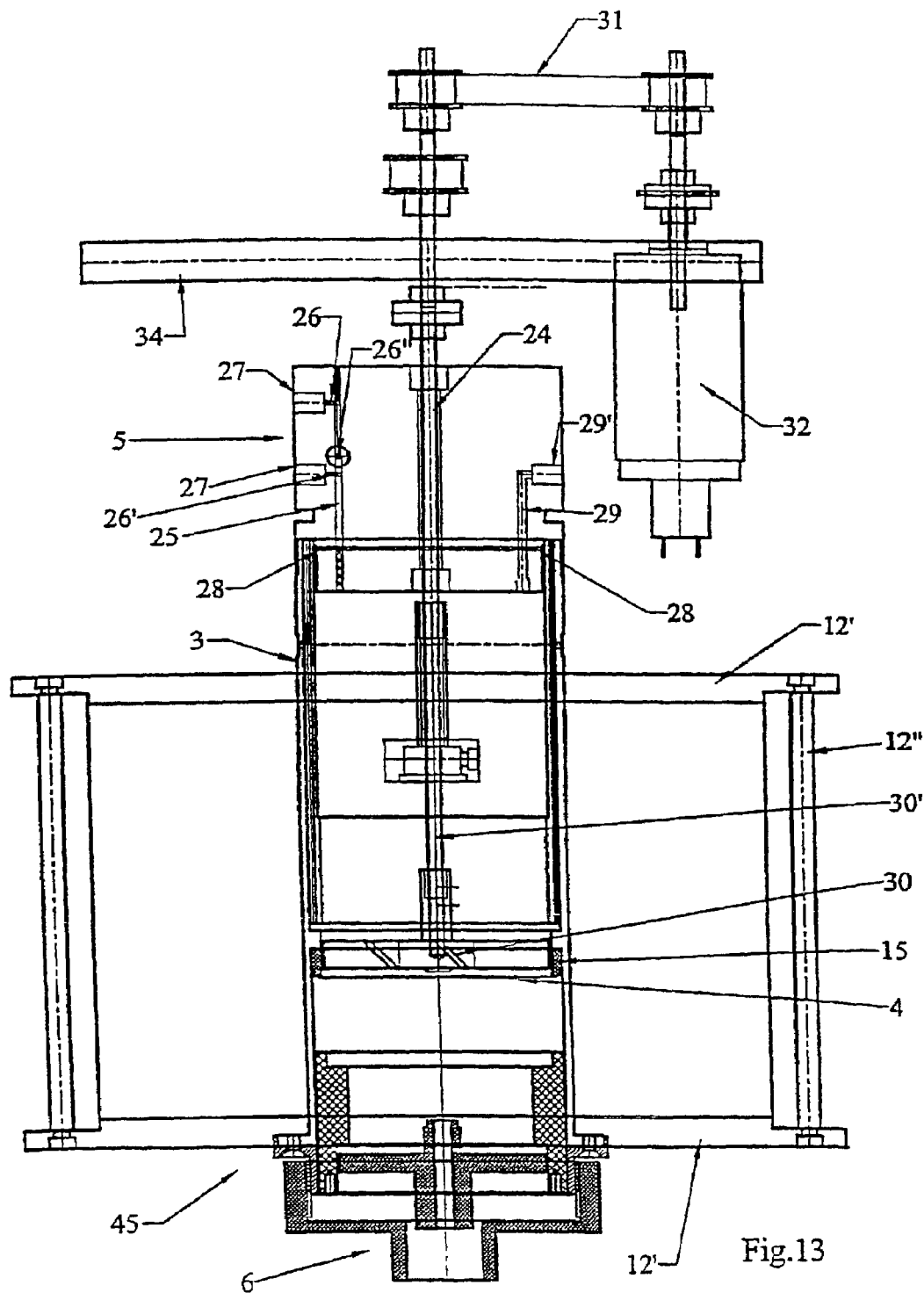
FIG. 13 is a side elevational view of the container of FIG. 11 provided with an injection head and a drive mechanism for the agitating member.

In FIGS. 11 to 13, the constituent elements of the container 45 corresponding to the analogous constituent elements of a reactor 2, have the same reference numerals as the latter, although their shape, configuration and dimensions can be different.

Of course, the invention is not limited to the embodiment shown and described in the accompanying drawings. Modifications remain possible, particularly as to the construction of the various elements or by substitution of technical equivalents, without thereby departing from the scope of protection of the invention.

The invention claimed is:

1. Module for the synthesis of molecules, particularly organic, on or in solid phase, characterized in that it is principally constituted by several, preferably at least two and at most ten, separate synthesis reactors (2), arranged in a circular arrangement with equiangular distribution and each formed by a tubular body (3) forming a reaction chamber (3') delimited in its lower portion by a removable porous wall (4), adapted to retain the material forming a synthesis support, by a head (5) for injection and expansion forming an upper closure plug for the tubular body (3), and by a base (6) for closing and emptying, mounted removably in a lower prolongation (3") of the tubular body (3) and ensuring the peripheral sealed holding of the retention wall (4), each reactor (2) being provided with a heat exchanger (7) in intimate peripheral contact with the tubular body (3) at the level of the portion (3''') of the chamber (3') adapted to contain the medium and the reaction compounds, and by a condenser (8) in intimate peripheral contact with the body (3) at the level of a portion (3'''') of the chamber (3') extending above the latter (3''') containing the medium and the reaction compounds and below the injection head (5), and said assembly of reactors (2) being mounted in an insulating structure (9) surrounding said reactors (2) at the level of said exchangers (7) and said condensers (8), the action of these latter being similar for all the reactors (2) of the module (1) and the insulation being homogeneous for all the reactors (2), such that said reactors (2) will be continuously subject to identical thermal conditions, wherein the insulating structure (9) is constituted by portions of rigid insulating material (9'), peripherally surrounding the assembly of reactors (2) and forming substantially a ring about this latter, and by an insulating material (9'') that is pulverulent or formed of balls of small diameter contained in the ring formed by the portions of rigid insulating material (9') and filling the free volumes between said bodies (3) of the different reactors (2).

2. Module according to claim 1, characterized in that it comprises between three and seven synthesis reactors (2) and in that the condenser (8) and the exchanger (7) of a same reactor (2) are physically separated, as the case may be with interposition of an insulating material, and connected to supply and evacuation lines (10, 11) for separate heat exchange fluid or fluids, the temperature of the fluid, preferably liquid, for the condensers (8) being adapted to vary from ambient temperature to about 15° C. and the temperature of the gaseous fluid for the exchangers (7) being adapted to vary between about −80° C. and about +100° C.

3. Module according to claim 1, characterized in that the insulating structure (9) has an external flattened cylindrical shape, permitting access to the bases (6) and leaving the injection heads (5) exposed, and is comprised between two parallel separated disc-shaped plates (12') connected by cross-members (12'') and together forming an assembly and support structure (12) on which are mounted the tubular bodies (3) of the synthesis reactors (2), said structure (12) being, as the case may be, covered or surrounded peripherally or over all its external surface with a film, a sheet, a plate or the like of material that reflects thermal radiation and having vapor-resistant properties and said structure (12) carrying if desired said exchangers (7) and/or condensers (8) and/or a portion of their supply and evacuation lines (10, 11).

4. Module according to claim 1, characterized in that the assembly of exchangers (7), and the assembly of condensers (8), is surrounded peripherally by one or several layers of ceramic cloth (9'''), forming insulating protective walls between these elements (7, 8) and the internal surface of the ring of rigid insulating material (9'), the exchangers (7) being also sandwiched between two discs (9'''') of ceramic cloth so as to completely enclose said exchangers (7) in a cocoon of ceramic cloth.

5. Module according to claim 1, characterized in that the condensers (8) and the exchangers (7) are each constituted by a plurality of adjacent helicoidal windings of a metallic conduit with rectangular or square cross-section, the fittings (7', 8') for supply and evacuation of all the condensers (8) and exchangers (7) being directed radially inwardly of the circular arrangement formed by the assembly of reactors (2) and connected to central portions (10', 11') for radial connection and distribution of supply and evacuation lines (10, 11) of heat exchange fluid or fluids, the supply and evacuation lines (10, 11) being connected to said central connection and distribution portions (10', 11') by the two sides or opposite surfaces (1', 1'') of said module (1).

6. Module according to claim 1, characterized in that each tubular body (3) comprises, on the one hand, at the level of its interface with its lower prolongation (3''), an inwardly projecting ring (13) forming a circumferential abutment for blocking and sealed peripheral locking of the retention wall (4) for the material forming a synthesis support, for example in the form of a disc-shaped filter, and on the other hand, several longitudinal conduits (14, 14', 14'') for injection or passage, hollowed into the thickness of its wall and extending from the upper edge of said body (3), or at least from an upper portion of the body (3) located beyond the insulating structure (9), to the level of the portion (3''') of the reaction chamber (3').

7. Module according to claim 1, characterized in that each base (6) for closing and emptying is constituted, on the one hand, by a bearing and sealing ring (15) mounted in the tubular prolongation (3'') of the tubular body (3) of said reactor (2) and provided with at least one circumferential rib (15') for peripherally pinching the wall (4), on the other hand, by a body (16) for supporting and compressing the compressible porous retention wall (4) comprising, on the side directed toward said wall (4), a flat external circumferential bearing surface (16') facing the rib or ribs (15') of the ring (15) and a conical internal surface (16'') inclined toward a central evacuation opening (17) connected to an axial emptying channel (17') hollowed into said body (16) and provided with protuberances (18) for supporting the porous retention wall (4) and, finally, by a removable assembly (19, 20) for gripping the support and compression body (16) against the bearing ring (15) and the connection of a conduit or tube to the outlet of the emptying channel (17').

8. Module according to claim 7, characterized in that the removable gripping assembly is comprised by a member (19) for guiding and transmission of the pressure forces between a nut (20), preferably double screw-threaded and with a Z shaped cross-section, engaging by screwing with a screw-threaded casing (21) secured to the prolongation (3'') of the tubular body (3) and the body (16) for support and compression of the retaining wall (4), comprising a first hollow cylindrical portion (22) coming into contact, shapematingly, against the rear surface of the support and compression body (16) by axially guiding a rear prolongation (16''') of said body (16) on which is mounted a connection member (23) of a connection fitting (23') of a conduit or tube adapted to be connected to the axial emptying channel (17'), and a second cylindrical portion (22') comprising a portion forming a washer interposed between the first cylindrical portion (22) and a force application surface (20') of the nut (20) and a cylindrical portion prolonging said portion forming a washer and ensuring the guidance of the nut (20) relative to the piece (19) for guiding and transmitting forces and holding and guiding a proximal portion of the conduit or tube connected to the axial emptying channel (17').

9. Module according to claim 1, characterized in that the injection head (5) comprises, on the one hand, an axial through passage (24) for mounting with facility of rotation an element in the form of a rod (30'), on the one hand, a principal eccentric injection channel (25) connected upstream to several supply channels (26, 26', 26'') prolonging lateral sites (27) of connection of conduits or tubes for delivering fluid or fluids and opening into said injection channel (25) at places offset along this latter and, downstream, to channels (28) for radial distribution from the downstream end of said injection channel (25) and opening adjacent the upper edge of the internal surface of the wall of the upper portion of the tubular body (3) of the reactor (2) in question, with regular distribution and substantially equivalent pressure drops, and, finally, by an eccentric channel (29) for expansion and evacuation of the gaseous fluids, opening in the lower surface of the injection head (5) and connected to a lateral site (29') for corresponding external connection.

10. Module according to claim 1, characterized in that each reactor (2) is provided with a rotatable member (30) for mechanical agitation of the medium or mixture contained in the reaction chamber (3') in question, in the form of a helix located at a small distance above the retaining wall (4) of the synthesis support and mounted on the end of a rod (30') forming a shaft or axle passing through the injection head (5) at the level of a suitable axial passage (24) and provided at its opposite end with a notched pulley (30") or similar element for being driven by a member (31') for transmission and distribution of movement, for example of the notched belt type, interconnecting the pulleys (30") of the agitation members (30) of the different reactors (2) of the module (1), the synchronous rotation of the different agitation members (30) being effected by a variable speed motor (32) directly or indirectly driving said transmission and distribution member (31'), and mounted, together with said pulleys (30") and said member (31'), as well as if desired with return pulleys and one or more belt tighteners (33, 33') on a suitable support structure (34), removably, on the module (1).

11. Module according to claim 1, characterized in that the tubular bodies (3) of the reactors (2) with their prolongations (3") are formed of a single piece in olytrifluorochlorethylene, as well as the injection heads (5), in that the exchangers (7) and condensers (8), with their associated connection and distribution portions (10' and 11') are made of nickel copper and in that the support structures (12 and 34) are made of aluminum or an anodized aluminum alloy.

12. Apparatus for the synthesis of organic molecules in solid phase, with automatic or semiautomatic operation, characterized in that it comprises at least one module (1) according to claim 1.

13. Apparatus according to claim 12, characterized in that the module or modules (1) are connected, on the one hand, at the level of the reactors (2), of the reservoirs (35, 36, 37, 38, 39, 40) for solvent or solvents, of compounds or elemental substances for syntheses, of synthesis support substance, of reagents, of emptying, of recovery of waste, of expansion or the like, by means of a network for distribution and transfer constituted by a network of conduits or tubes (41') interconnected with single path or multi-path units (41) of membrane valves, also integrating volumetric measures (42), the displacement of fluids in said network taking place under the action of gas under pressure, for example argon or nitrogen, whose use for pressurizing the different fluid segments is controlled by predetermined sequential actuation of suitable valve units (41), the times of opening said valves determining the volumes transferred, and, on the other hand, at the level of the exchangers (7) and condensers (8), supply units (43, 43') for heat exchange heating and cooling fluid or fluids through suitable supply circuits formed of supply and evacuation lines (10, 11), said apparatus moreover comprising a computer unit (44) for controlling and managing the actuation of the different units of membrane valves (41) and the operation of the supply units (43, 43') for heat exchange gaseous fluids, by means of suitable interfacing and multiplexing circuits (44'), permitting control in terms of sequences of synthesis and selection between entirely automatic or semiautomatic operation, step by step, of said apparatus.

14. Apparatus according to claim 13, characterized in that the computer unit (44) also monitors the operation of the motor (32) driving the mechanical agitation members (30) in the form of helices, with control to at least two different speeds of rotation, namely a low speed for suspending and homogenization of the reaction mixture and a high speed for the generation of a vortex adapted to ensure de-compaction of the synthesis support.

15. Apparatus according to claim 12, characterized in that it comprises several modules (1) and in that each module (1) is associated with a container (45) forming an exchange and distribution chamber, whose internal volume corresponds to the sum of the internal volumes of the reactors (2) of the module (1) with which it is associated, whose construction is identical to those of said reactors (2) except for the size of the constituent elements, being adapted to be connected to said reactors (2) by a portion of the distribution and transfer network comprising at least one multi-path unit (41) with membrane valves and, as the case may be, provided with a mechanical agitation member (30), with a heat exchange (7), with a condenser (8) and with thermal insulation over at least a portion of its tubular body (3).

16. Module according to claim 1, characterized in that the portions of rigid insulating material (9') are made of polyisocyanurate foam and in that the insulating material (9") that is pulverulent or formed of balls of small diameter is made of perlitic rhyolite.

\* \* \* \* \*